Figure 1:
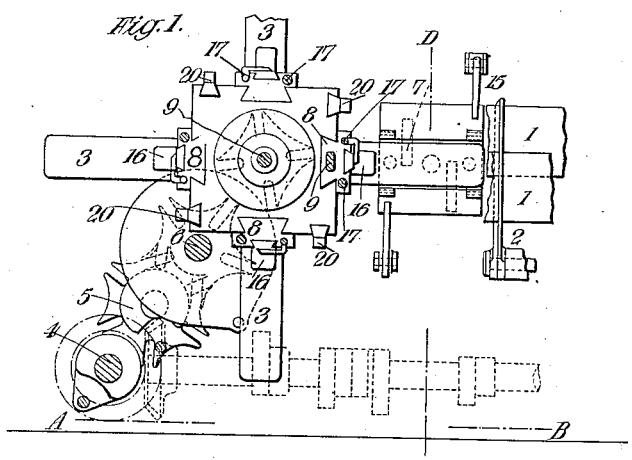

J. MAYER-VERRIE.
MACHINE FOR CUTTING, FOLDING, AND COLLECTING CIGARETTE AND OTHER PAPERS.
APPLICATION FILED JUNE 5, 1911.

1,035,211.

Patented Aug. 13, 1912.

4 SHEETS—SHEET 1.

J. MAYER-VERRIE.
MACHINE FOR CUTTING, FOLDING, AND COLLECTING CIGARETTE AND OTHER PAPERS.
APPLICATION FILED JUNE 5, 1911.
1,035,211.
Patented Aug. 13, 1912.
4 SHEETS—SHEET 2.
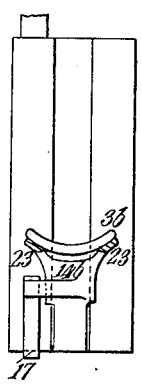
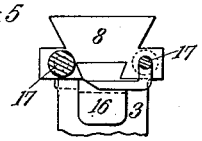
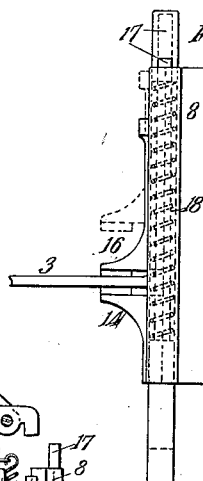
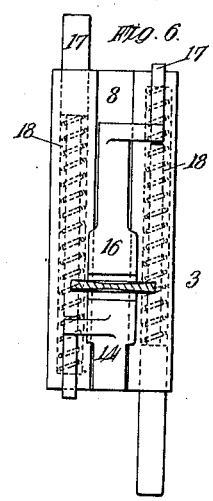
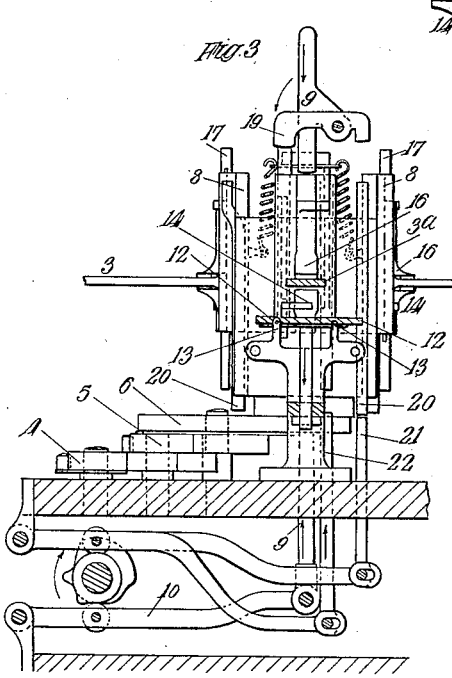
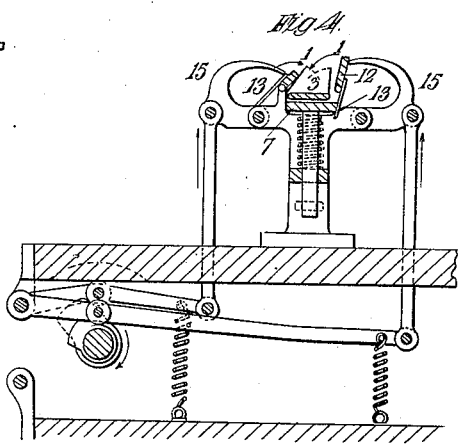

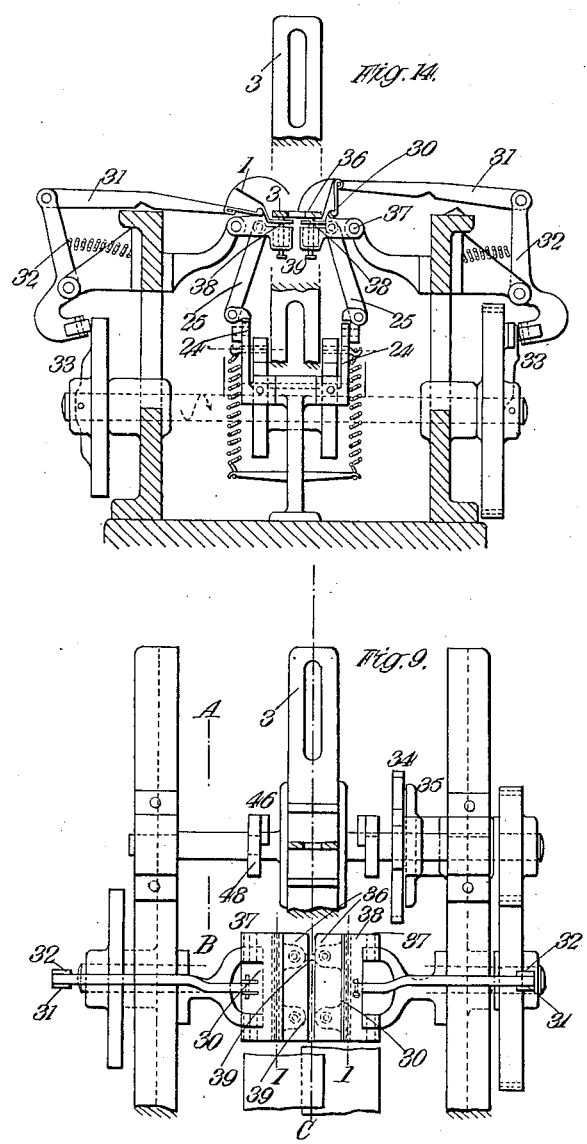

J. MAYER-VERRIE.
MACHINE FOR CUTTING, FOLDING, AND COLLECTING CIGARETTE AND OTHER PAPERS.
APPLICATION FILED JUNE 5, 1911.
1,035,211.
Patented Aug. 13, 1912.
4 SHEETS—SHEET 4.
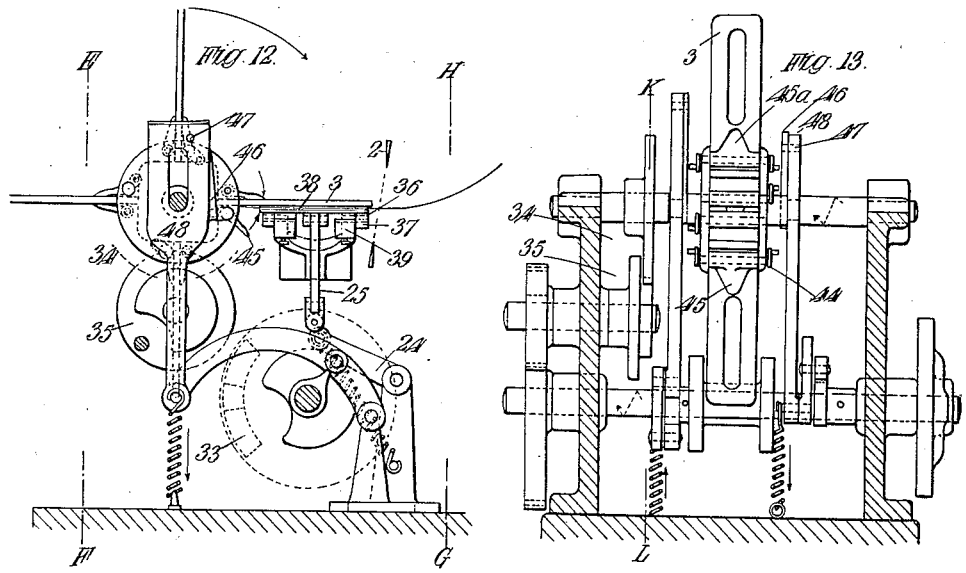
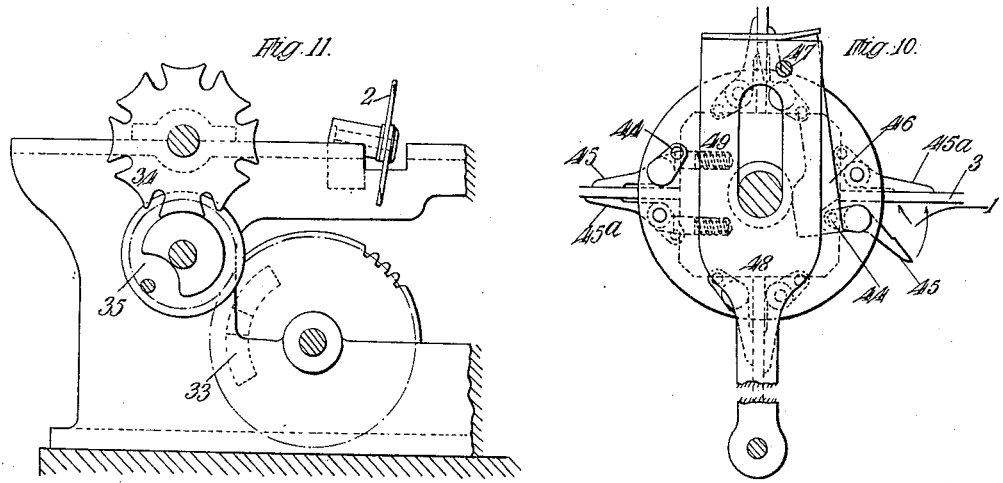
Witnesses:
Karl Paul Müller
Sydney Mayer
Inventor,
Julius Mayer-Verrie

UNITED STATES PATENT OFFICE.

JULIUS MAYER-VERRIE, OF LONDON, ENGLAND.

MACHINE FOR CUTTING, FOLDING, AND COLLECTING CIGARETTE AND OTHER PAPERS.

1,035,211. Specification of Letters Patent. Patented Aug. 13, 1912.

Application filed June 5, 1911. Serial No. 631,453.

*To all whom it may concern:*

Be it known that I, JULIUS MAYER-VERRIE, a native of Germany, residing at 109 Lever street, in the city of London, in the county of Middlesex and Kingdom of England, have invented a Machine for Cutting, Folding, and Collecting Cigarette and other Papers.

This invention relates to machines, on which paper strips of indefinite length are cut to any desired size, folded, and a certain number of leaves collected. These leaves can be provided with a gummed edge, a gold, cork or other tip, or printed by the already well known devices attached to the machine, if not bobbins thus tipped, gummed or printed are used.

The machine consists mainly of several holders for the single leaves and a table, above which the holder stands at the time the paper is brought on the table. Around this holder the papers are folded and held fast by suitable means. The holders are fixed to a movable axle so that the holders which have picked up the desired number of leaves are moved out of the working position at the right moment and make room for the next holder. This axle may be arranged either vertically or horizontally and so that it collects on each holder the complete number of leaves before it turns, or only two leaves on each holder at a time, till after a certain number of revolutions each holder has the desired number of leaves. The paper is fed from one or more reels, but if two or more are employed they are placed in such position that the strips partly overlap. The strips are cut by suitably arranged scissors to the required length.

In the drawings two constructions are shown.

Figure 2:
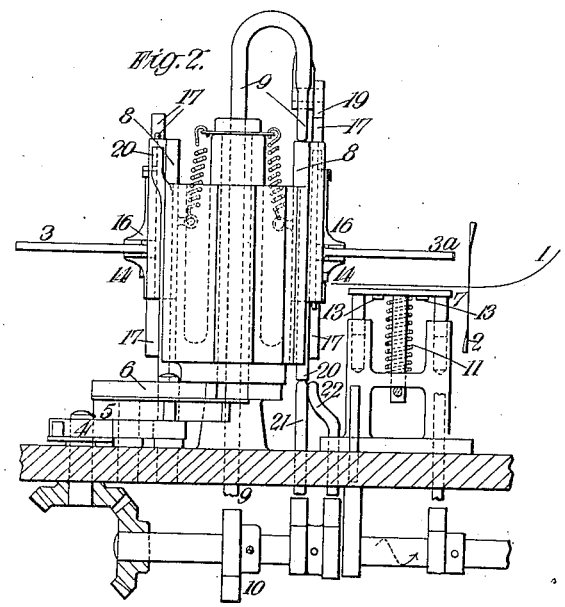

Figures 1 to 8 represent the machine with a collector turning around a vertical spindle, moving each holder out of working position after it has collected the complete number of leaves. Fig. 1. is a plan thereof. Fig. 2. is a section on line A—B. Fig. 3 is a section on line C.—D. Fig. 4 is a front elevation of the folding table. Fig. 5. is a plan of a guide-block with finger and holder. Fig. 6. is a front elevation thereof. Fig. 7 a side elevation. Fig. 8. the modification of a holder for collecting unfolded papers. Figs. 5. to 8 are double the size of the other views. Figs. 9 to 14 show the invention with a collector turning around a horizontal axle and moving each holder out of working position after two leaves have been taken up, continuing this till all holders have the right number of leaves. Fig. 9. is a plan thereof. Fig. 10 is a view of the collector in double size of the other views. Fig. 11. is a section on line L.—K. Fig. 12. is a section on line A.—B.—C. shown in Fig. 9. Fig. 13 a section on line E.—F. Fig. 14 a section on line G.—H.

In both constructions the collecting devices are shown with four holders, but a smaller or larger number of holders may be used.

In construction as per Figs. 1 to 7 two paper strips 1. are fed by suitable rollers upon the table and there cut by scissors 2. to the desired length, the papers being at the time underneath the working holder $3^a$.

The holders 3 are fastened crosswise to a head or pillar, which turns each time 90° around a vertical axle by means of a triple driving and self stopping gearing 4. 5. 6. as soon as the working holder $3^a$ has picked up the desired number of leaves. The folding table consists principally of the table plate 7, which plate rests on spring 11 and has two pins gliding in sockets (drilled into the frame) so that it can be moved down by the pressure of the working holder $3^a$. After the paper has been brought on the table the working holder $3^a$ is pushed down in order to hold the paper on the table. Each holder 3 is fixed to a guide-block 8 and slides in a groove of the above mentioned head. The working guide-block 8 with its holder is moved by rod 9, the upper bent end of which presses on it. The lower end of rod 9 is joined to the end of a lever 10, which at its other end is hinged to the stand and actuated by a cam-disk fixed to the driving shaft, so that the holder $3^a$ is first moved down on the table plate to hold the paper firmly in position and then still further down to press the table plate down with it. When rod 9 is raised block 8 is moved upward again by a spring. Each guide-block 8 is provided with two small slides with projecting pieces, called fingers, one 14 below the holder 3 and the other 16 above the holder 3. Each of these fingers is moved by a guide-rod 17, sliding in a hole of guide-block 8 and pressed through a spring 18 against the holder 3. The fingers are set to work by levers similar to the one No. 10 above described and cam-disks. These levers carry at the free end rods 21, 22. guided through holes in the stand. At the right moment the upper finger 16 is raised by means of said pusher 22, which presses directly from below against its guide-rod 17, whereas the lower finger is depressed through pusher 21 lifting slide piece 20 (in guide-block 8) till it presses against the one arm of lever 19, (fastened to rod 9) causing its other arm to descend and to push the guide-rod 17 with the lower finger 14 down with it. When the fingers have done their work they are brought back through springs 18 to their original position.

Immediately after the paper has been held between table and holder, the lower finger 14 is depressed as described, so that the paper can lie its full length along the holder; then the finger returns again and presses the paper against the holder 3 holding it tightly in position. To the two longest sides of the table frame are fixed by means of hinge-joints a folding plate 12 which plates have each a tail-piece 13. These tail-pieces rest when not at work on the under side of the table plate and keep the folding plates when not at work in horizontal position, so that the folders form a continuation of the table plate. If the table plate is depressed by the downward moving holder 3ª the two folders 12 are lifted through their tail-ends 13 about 90° upward, so that they lift up with it those ends of the papers which are not held between the holder and the table plate and are lying on them. When this is done the folders are caught by the two levers 15 which push them one after the other down on holder 3.

The two folders 12 are of unequal length in the direction of their motion and are pushed down one after the other, so that the smaller folder first folds the one edge of the paper then the other folds the second edge of the paper and in doing so holds down the overlapping edges of the folded papers. When this is done the upper finger goes up and down in the above described manner, so that the papers can lie on the holder in their full length, where they are held securely by finger 14 and 16. Now the holder with the collected papers rises, the paper strips are moved forward, cut and folded around holder and the same operation as described is repeated till the desired number of leaves (here 60) has been collected on the holder. The increasing thickness of the holder through the gradually collected papers is counterbalanced through the springs of the table and fingers. When the holder has its desired number of papers it is turned around 90° with the head through the gearing 4. 5. 6. driving and self stopping, so that the next empty holder enters into the working position and the full holder being now out of reach of the collecting arrangements is relieved of the packet of folded and collected papers and is thus ready for work again when its turn comes. With this machine also unfolded papers can be collected by taking away the folders and upper finger. For this purpose it is better to make the holder 3 with a curved profile 3ᵇ. (Fig. 8) which allows the papers to be held more rigidly. Of course the table 23 and the lower finger 14ᵇ must receive a similarly curved shape.

The construction Figs. 9 to 14 has a collector with holders turning around a horizontal axle. The paper strips are passed like in the first construction on to the folding table by rollers and cut there by scissors 2 placed in a slanting position to the required length. In this construction the collecting head is turned by means of a driving and self stopping gear 34. 35. after each folding, so that all holders are working one after the other till all have the required number of sheets. The holders turn in steps of 45° giving two movements to each folding. In the first position the paper is brought on the table and in the second it is folded. The table consists of two plates 36 resting with springs on two table-halves 38 which are turnable downward by means of hinges 37 in such a manner that they allow free passage to the holder. The table halves bear each two pots 39 with springs supporting the table plates 36, by which means these latter can adapt themselves to the varying thickness of the holder due to the increasing number of papers. Each half of the table 38 bears also a hinge-joint folder 30 for folding the papers around the holder 3. These folding-flaps are lifted up with the paper-ends lying on them by means of levers 31. 32. and profile rings 33. When the holder has moved down toward the table 45°, the paper is conveyed on the table plates 36, then the holder turns around a further 45° (Figs. 12. and 14) so that the paper-strips are firmly held between the table and holder while they are cut by the scissors. For holding the paper to the holder two fingers are provided one upper 45ª and a lower 45., which however are hinge-joined to the turnable head carrying the holder 3 and have each at the back a little arm with a pin 44. A spring 49 acting on the arm 44 serves to press the fingers against the holders. As soon as the holder has pressed the paper down on the table, the lower finger 45 is opened in order to make room for the paper and that same can lie straight along the holder. For this purpose slider 48 is provided. It glides by means of a longitudinal slit on the spindle of the collecting head, and is actuated by a cam-disk. To this slider is hinge-joined by a bolt 47 a catch 46, which opens the finger 45 with the upward movement of the slider. When the slider moves downward again, the arm 44 comes out of connection with the catch 46, and finger 45 returns by means of spring 49 (Fig. 10) to its former position, thus holding the papers firmly from below. The folders 30 next fold the papers one after the other around the holder 3 while the upper finger 45ª (set going like 45.) opens and shuts again after the paper has slipped between it and the holder, holds the now completely folded papers firmly from above. As soon as this is done the folders 30 can go back. To collect the next papers on the following holder, the two table-halves 38 swing down by means of connecting rods 25, levers 24 and cam-disks in order to enable the holder 3 to turn a further 45° after which the two table-halves 38 return to their former position, and other paper can be placed on the table to be folded around the next holder. This same process repeats itself and after each holder has collected the desired number of sheets the packets are taken off.

In both constructions the inside corners of the folding-plates nearest the collector may be rounded off, so that the paper-ends which are lifted up by the opening of the fingers cannot be damaged. The flat sides of the holders can be hollowed out in the middle to give more room to the overlapping paper-edges.

In both constructions the table is made of shorter length than the length of the paper to be collected in order to have ample room at the one end for the action of the fingers and at the other end for the working of the scissors.

Having thus described my invention I declare what I claim is:—

1. A machine for cutting, folding and collecting cigarette and other papers fed from two partly overlapping endless strips comprising a table resting on springs with folding wings at two sides, a head having a plurality of holders located adjacent to said table and movable to bring each of said holders successively upon the table to hold said papers, scissors for cutting the paper, said folding wings adapted to fold the ends of the papers, which are not covered by the said holder, one after the other around said holder, so that the upper and lower edges of the papers overlap, an upper and a lower finger adapted to hold the papers thus collected on the said holder, so that this holder can move away with same.

2. A machine of the character described comprising a table resting on springs so as to yield according to the growing number of papers, folding wings of unequal width in the direction of their motion hinged to the two longest sides of said table, a head having a plurality of holders located adjacent to said table and movable to bring each of said holders successively upon the table, said holders having flat sides, these flat sides being hollowed out in the middle, so that the overlapping edges of the papers find room in this hollowed out space, when they are folded around the holder by means of said holder pressing down on two already partly overlapping papers on said table, said folding wings adapted to fold the other ends one after the other on the holder from above, so that these also overlap.

3. A machine of the character described comprising a holding device consisting of a movable head having a plurality of holders, each holder with an upper and lower finger adapted to secure papers folded in succession around said holders, scissors, a folding table constructed so as to leave room at one end for the action of the fingers and at the other end for the working of the scissors and adapted through springs to firmly hold papers pressed between it and the holder for cutting and folding, two folders hinged to said table lying when at rest level with said table and provided with tail ends which on being depressed raise the folders out of their horizontal position with the ends of the papers on them, levers adapted to push said folders one after the other down on the holder.

In testimony whereof I affix my signature in presence of two witnesses, London, this 25th day of May 1911.

JULIUS MAYER-VERRIE.

Witnesses:
R. WESTACOTT,
C. P. LIDDON.

---

Copies of this patent may be obtained for five cents each, by addressing the "Commissioner of Patents, Washington, D. C."